(12) United States Patent
Le Jeune et al.

(10) Patent No.: US 7,128,529 B2
(45) Date of Patent: Oct. 31, 2006

(54) PERFECTED DEVICE FOR SECURING AN ENGINE SHAFT ON A BEARING SUPPORT

(75) Inventors: Pascal Le Jeune, Samoreau-Avon (FR); Gilles Charier, La Grande Paroisse (FR)

(73) Assignee: Snecma Moteurs, Paris (FR)

( * ) Notice: Subject to any disclaimer, the term of this patent is extended or adjusted under 35 U.S.C. 154(b) by 163 days.

(21) Appl. No.: 10/876,693

(22) Filed: Jun. 28, 2004

(65) Prior Publication Data

US 2005/0013696 A1   Jan. 20, 2005

(30) Foreign Application Priority Data

Jul. 15, 2003   (FR) .................................. 03 08612

(51) Int. Cl.
*F04D 29/04* (2006.01)
*F03B 11/06* (2006.01)

(52) U.S. Cl. .................................. 415/229; 416/244 A (58) Field of Classification Search ............. 415/170.1, 415/131, 132, 216.1, 229; 416/174, 244 A; 384/540
See application file for complete search history.

(56) References Cited

U.S. PATENT DOCUMENTS

| | | | |
|---|---|---|---|
| 3,402,750 A | | 9/1968 | Readman et al. |
| 4,193,741 A | * | 3/1980 | Briggs .................... 416/170 R |
| 4,201,426 A | * | 5/1980 | Garten et al. ............... 384/563 |
| 4,456,425 A | * | 6/1984 | McCarty et al. ......... 415/122.1 |
| 6,338,578 B1 | * | 1/2002 | Adde et al. ................ 384/540 |

FOREIGN PATENT DOCUMENTS

| | | |
|---|---|---|
| EP | 0 359 659 A1 | 3/1990 |
| FR | 2 633 023 | 12/1989 |
| GB | 1 205 199 | 9/1970 |

* cited by examiner

*Primary Examiner*—Edward K. Look
*Assistant Examiner*—Dwayne J White
(74) *Attorney, Agent, or Firm*—Oblon, Spivak, McClelland, Maier & Neustadt, P.C.

(57) ABSTRACT

A device (D) is dedicated to securing a machine shaft (AIP) on a bearing support (SP). This device (D) comprises i) a locknut (19) provided with a stop, comprising a front face (23), a thread (20) intended to interact with a thread (7) of the bearing support (SP), and first coupling means (22), ii) an extraction nut (11) comprising a thread (12) intended to interact with a thread (1) of the shaft (AIP), inverted in relation to the thread (7) of the bearing support (SP), two coupling means (17) and a stop (13) provided with a front face, intended to be supported on a rear face (8) of a stop of the bearing support (SP), and a rear face (14) on which butts the front face (23) of the locknut stop (19) when it is located in an immobilisation position, and iii) a nut lock (24) provided with third (29) and fourth (26) coupling means, designed so as to interact respectively with the first (22) and second (17) coupling means, in order to couple in rotation the extraction nut (11) and the locknut (19) once they have been located in an immobilisation position.

35 Claims, 5 Drawing Sheets

PERFECTED DEVICE FOR SECURING AN ENGINE SHAFT ON A BEARING SUPPORT

The invention relates to the area of securing engine shafts on bearing supports (or journals), in particular when the engine is a turbo-engine.

The securing (or coupling) of an engine shaft (or machine shaft) on a bearing support is a complex operation requiring a dedicated device. Such a device generally comprises, as a first part, an extraction nut, provided with a thread which interacts with the thread of the shaft, as a second part, a locknut, provided with a thread which interacts with a thread on the bearing support in such a way as to immobilise the shaft in relation to the bearing in a chosen position, and as a third part a nut lock intended to immobilise the nut or the locknut.

The securing is rendered all the more difficult if the space in which the shaft and the bearing support are located is confined and/or obstructed.

The operation of disconnecting is still more difficult, particularly in the case of turbo-engines such as turboprop engines, due to the fact that several shafts are coupled to adjacent stages referred to as "low pressure (LP)", "intermediate pressure (IP)", and "high pressure (HP)". More precisely, in modem turbo-engines, once the low-pressure shaft has been removed the assembly screws of the intermediate-pressure shaft are not accessible. Moreover, the intermediate-pressure shaft cannot be dismantled from the rear, as access to the high-pressure (HP) stage, located just behind the intermediate-pressure stage, requires the complete dismantling of the engine. Due to the high number of elements to be dismantled (including the reduction elements), maintenance and repair operations prove particularly troublesome.

In addition to this, since the components constituting current securing devices are not linked to one another, the probability of losing one inside the engine is relatively high.

The object of the invention is therefore to remedy all or part of the foregoing disadvantages.

To this end, a device is proposed which is dedicated to the securing (or coupling) of an engine shaft on a bearing support, comprising an extraction nut, provided with a thread intended to interact with a first thread of the shaft, and a locknut, provided with a thread intended to interact with a second thread of the bearing support, in order to immobilise the shaft in relation to the bearing, in a chosen position.

This device is characterised, on the one hand, by the fact that i) these first and second threads are inverted in relation to one another, ii) its locknut comprises a stop element provided with a front face and first coupling means, and iii) its extraction nut comprises second coupling means and a stop provided with a front face, intended to be supported on a rear face of a bearing support stop in order to define the chosen position, and a rear face against which the front face of the stop of the locknut butts up when placed in an immobilisation position. On the other hand, the device is characterised by the fact that it comprises a nut lock provided with third and fourth coupling means arranged in such a way as to interact respectively with the first and second coupling means, in order to couple in rotation the nut and the locknut once they have been placed in an immobilisation position which defines the position chosen.

In a first embodiment, the thread of the extraction nut is located on an inner face in such a way as to interact with the first thread which is located on an outside face of the shaft.

The thread of the locknut is then preferably located on an inner face in such a way as to interact with the second thread of the bearing support, which is located on an outside face.

In addition to this, the nut lock is preferably mounted at the transfer point on the extraction nut.

Moreover, the extraction nut may have an end part located opposite its stop, and provided with at least two claws, curved inwards, and comprising its second means of coupling. In this situation, the nut lock has a first end part, comprising its fourth means of coupling and arranged in such a way as to interact with the claws so as to ensure its coupling in rotation with the extraction nut. The first end part can then support a circlip for the stop, which is intended to interact with the claws in order, in the event of disassembly, to prevent the nut lock of the extraction nut coming adrift. Said claws can likewise define an accommodation point responsible for accommodating the blocking means, such as, for example, an elastic locking and retaining element, intended to locate the nut lock in its immobilisation position.

In addition, the locknut may also have an end part which extends the stop from the side opposite its front face, and which is provided with teeth constituting the first coupling means. In this case, the nut lock has a second end part provided with teeth which constitute the third coupling means and arranged in order to interact with the teeth of the locknut in order to ensure its coupling in rotation with the latter.

In a second embodiment, the thread of the extraction nut is located on an outer face in such a way as to interact with the first thread, which is located on an inner face of the shaft.

The thread of the locknut is then preferably located on an outer face in such a way as to interact with the second thread of the bearing support, which is located on an inner face.

In addition to this, the extraction nut preferably has a first end part provided with an outer thread and a second end part located opposite the first part in relation to its stop, and provided on an outer face with slide elements comprising the second coupling means. The nut lock therefore has a first end part provided with slide elements comprising the fourth coupling means and arranged in such a way as to interact with the slide elements of the extraction nut in order to ensure its coupling in rotation with the latter.

Moreover, the locknut may have an end part located opposite its stop and comprising an inner face provided with slide elements comprising the first coupling means. In this case, the nut lock has a first end part provided on an outside face with slide elements which comprise the third coupling means and arranged in such a way as to interact with the slide elements of the locknut in order to ensure its coupling in rotation with the latter. The first part of the nut lock can therefore be arranged in such a way as to be introduced by relocation between the first end part of the extraction nut and the end part of the locknut.

In addition to this, the nut lock may likewise comprise a second end part, opposed to the first end part and provided with at least one blocking stop intended to interact with a circlip mounted on the bearing support in order to block its passage in the event of dismantling.

The nut lock may likewise comprise, on an outer face, a throat accommodating an elastic blocking ring, which is intended to interact with a throat formed in an inner face of the bearing support, in order to locate the nut lock in its immobilisation position.

The device according to the invention is particularly well-suited, albeit in a non-exclusive manner, to the establishment as one solid unit of a shaft of a turbo-engine with a bearing support, in particular when the turbo-engine is a turboprop engine.

Other characteristics and advantages of the invention become apparent on the examination of the detailed description hereinafter, and the appended drawings, in which.

The appended drawings may serve not only to complete the invention, but also contribute to its definition, as appropriate.

The invention relates to a securing (or coupling) device for a shaft of an engine (or machine) on a bearing (or journal) support. Reference will be made hereinafter to a shaft of a turbo-engine, such as a turboprop engine of an aircraft. But of course the invention is not limited to this type of machine alone.

Figures 1, 4:
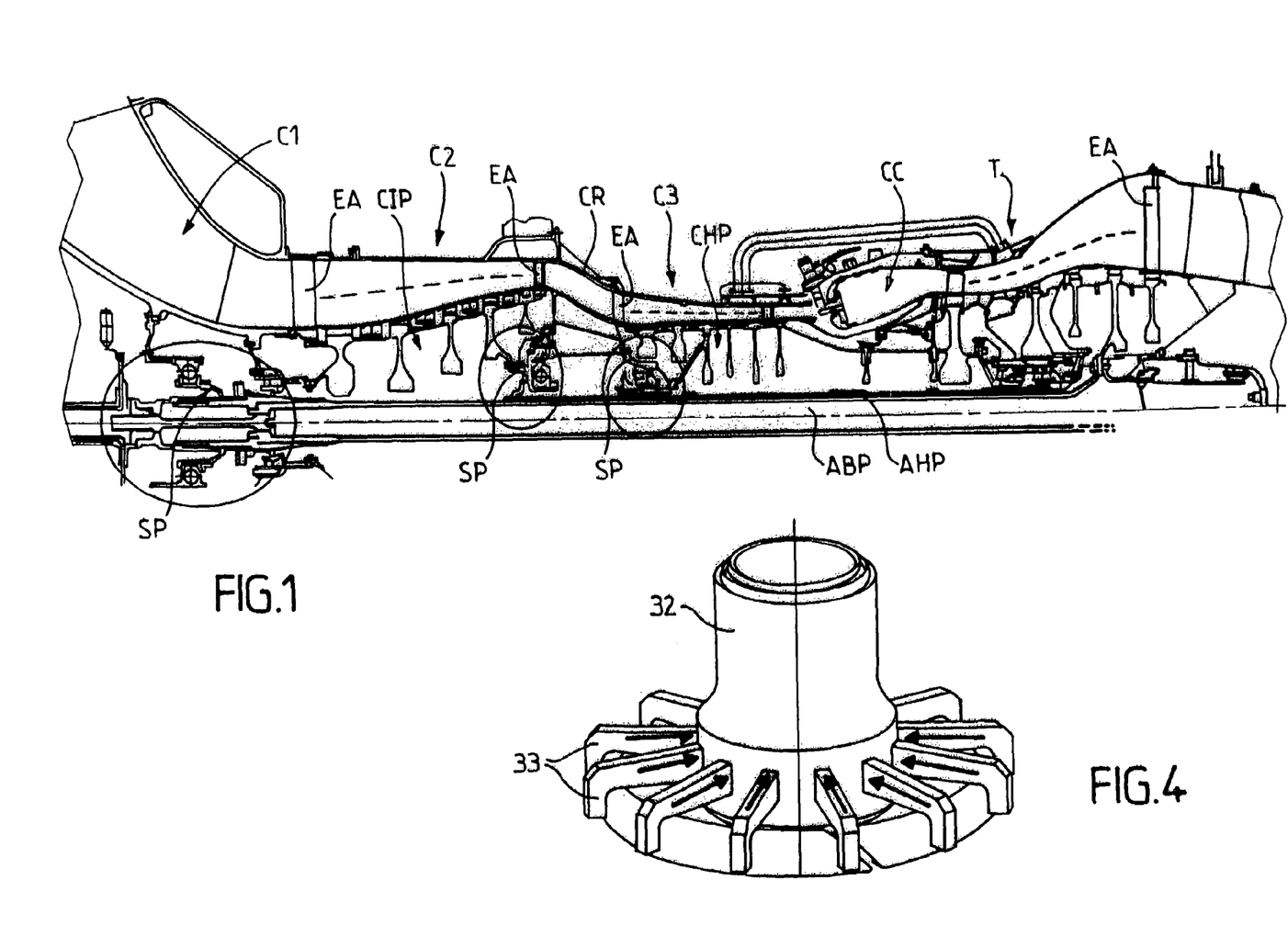
FIG. 1 is a diagrammatic view in a longitudinal sector of a part of the low-pressure, intermediate-pressure, and high-pressure stages of a turboprop engine.
FIG. 4 shows, in a diagrammatic representation, in a perspective view, a second tool enabling the extraction of the elastic immobilisation element of the device from FIG. 2.

Reference is made in the first instance to FIG. 1, to specify the installation location of a securing device according to the invention within the framework of the embodiment referred to heretofore.

A turboprop engine may comprise two or three body elements (or stages), located one after another. A first body element C1, referred to as "low pressure (LP)" (shown in part) serves to draw air in from the outside by aspiration with the aid of a fan blade (not shown), then of "pre-compressing" it with the aid of a first compressor CBP. A second body element C2, referred to as "intermediate pressure (IP)" serves the function of compressing the air which has been pre-compressed by the first body element C1, with the aid of a second compressor CIP. A third body element C3, referred to as "high pressure (HP)", serves the function of "over-compressing" the air which has been compressed by the second body element C2, with the aid of a third compressor CHP, before it enters a combustion chamber CC.

To do this, each compressor (LP, IP, or HP) comprises several stages of blades EA, set in rotation at the same time as the propeller by a shaft A, driven by a turbine T located downstream of the combustion chamber CC. The blades EA are, moreover, located in a space delimited by a housing CR.

In order to be able to drive the blades EA from a body element Ci, the corresponding shaft A must be coupled to this body element Ci by means of a securing device Di. More precisely, each body element Ci comprises a bearing support (or journal) SP, to which the shaft A is coupled by means of a securing device Di. In FIG. 1, the three coupling areas are circled.

Figure 2:
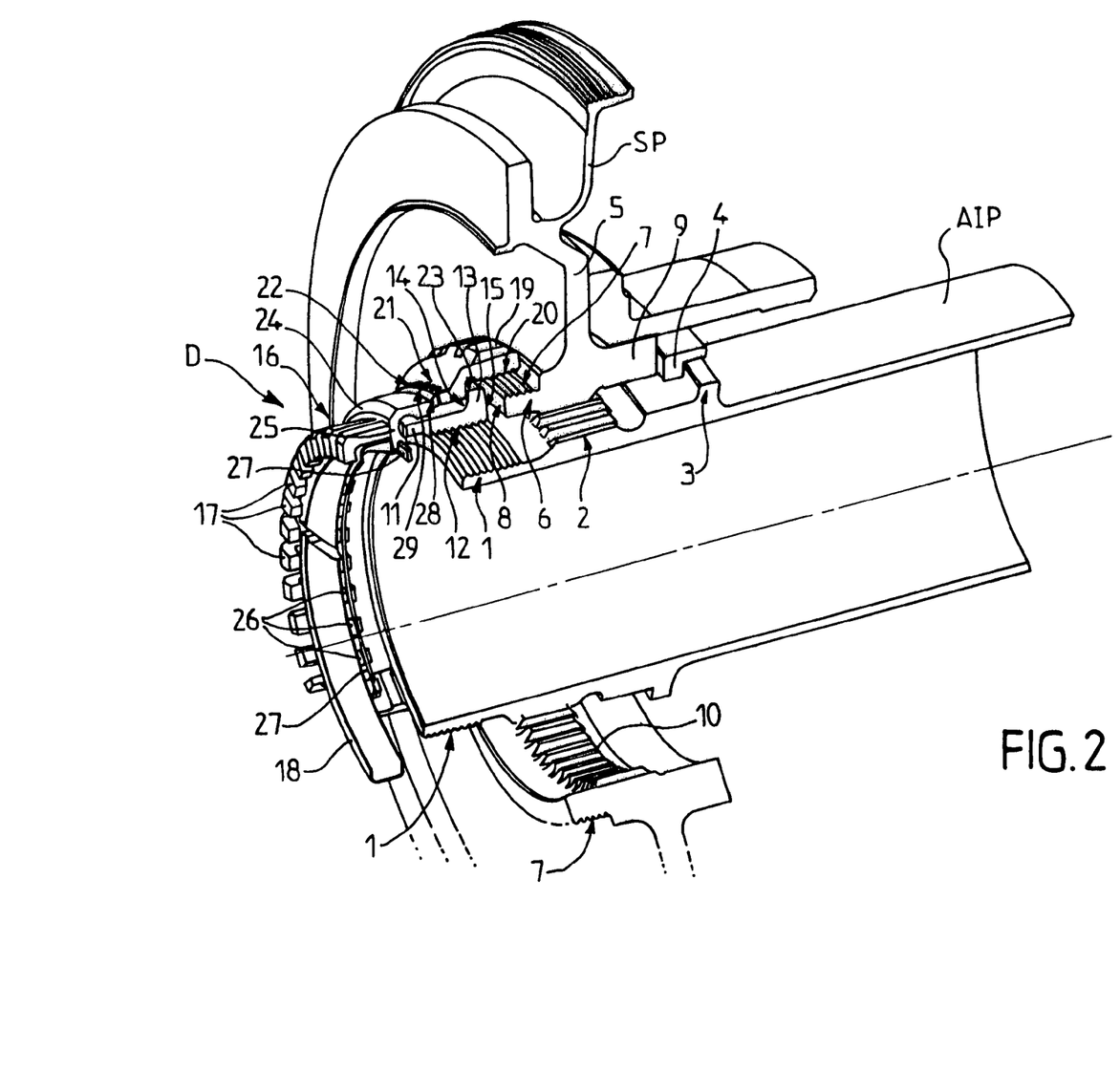
FIG. 2 shows, in a diagrammatic representation, in a longitudinal sectional view, in perspective, a first embodiment of a securing device according to the invention, in a state of immobilisation.

Reference is now made to FIG. 2, in order to describe a first embodiment of a securing device D according to the invention, intended to connect an intermediate-pressure shaft AIP to a bearing support SP of the second body element C2 (or intermediate-pressure body element) of a turboprop engine.

Hereinafter, four directions are defined in relation to the central cavity of the turboprop engine in which the shaft AIP is located. One direction, referred to as "internal", is directed towards the interior of the cavity. One direction, referred to as "external", is directed towards the exterior of the cavity. One direction, referred to as "forward", is directed towards a part downstream of the turboprop engine, in relation to the air flow. One direction, referred to as "back", is directed towards a part upstream of the turboprop engine, in relation to the air flow.

The device D is in this situation adapted to fit a shaft AIP, which comprises on one outer face, on the one hand, a first thread 1, and, on the other, slightly downstream of said first thread 1 and essentially perpendicular to it, slide elements (or grooves) 2. Preferably, the shaft AIP likewise comprises, on its outer face, slightly downstream of the slide elements 2, a stop 3, which preferably extends over the entire circumference of the shaft and is intended to interact with an adjustment key element 4.

In addition to this, the shaft AIP and the device D are adapted to fit a bearing support (or journal) SP, comprising a central part 5 in the form of a disk, hollowed in the centre to permit the passage of the shaft AIP, and on the rear face of which an essentially cylindrical circular rear part 6 projects onto an outer face of a second thread 7 and is terminated by a rear face of the stop element 8.

According to the invention, the first thread 1 and the second thread 7 are inverse in relation to one another.

In addition to this, on a front face of the central part 5, a front part 9 projects, preferably substantially cylindrical and circular, which is terminated by a face intended to be supported against a rear face of the adjustment key 4. Additionally, the central part 5 comprises, on an inner face, essentially between the rear part 6 and the front part 9, slide elements 10, essentially perpendicular to the second thread 7 and intended to interact with the slide elements 2 of the shaft AIP when the latter is displaced in relocation in relation to the bearing support SP during the coupling and uncoupling phases.

The securing device D comprises in the first instance an extraction (and locking) nut 11, comprising a central part provided on an inner face with a thread 12, intended to interact with the first thread 1 of the shaft AIP. The central part is extended by a front end part, which defines a stop element 13, preferably circular and provided with a rear face 14 and a front face 15 intended to be supported on the rear face of the stop 8 of the rear part 6 of the bearing support SP. In addition, the central part is likewise extended by a rear end part 16, defining the coupling means 17.

The coupling means 17 are in this case preferably the form of a plurality of claws which curve inwards and are spaced in a regular manner from one another. These claws extend over a length which is chosen in such a way as to define a space suitable for accommodating a blocking means (or screwing means) 18, in this case preferably in the form of an elastic retaining element (split element).

The securing device D likewise comprises a locknut 19, comprising a main part provided on an inner face with a thread 20, intended to interact with the second thread 7 of the bearing support SP, and terminated by a front face of the stop which is intended to be supported on the central part 5 of said bearing support SP. This main part is in this case extended by an end part 21, in a rear part of which are defined coupling means 22 and of which a front part defines a front face of the stop 23 intended to be supported on the rear face 14 of the stop 13 of the extraction nut 11.

The coupling means 22 in this situation are preferably designed in the form of a plurality of teeth, essentially parallel to the shaft AIP.

The securing device D additionally comprises a nut lock 24, mounted in translation on the extraction nut 11. The nut lock 24 comprises a first end part (rear) 25, defining coupling means 26, arranged in such a way as to interact with the claws 17 in order to ensure their coupling to the extraction nut 11. The coupling means 26 preferably constitute a comb element, the teeth of which are equally spaced, with the spacing being of lesser value than the distance separating the claws 17. Such an interaction between coupling means 17 and 26 allows for coupling in rotation of the extraction nut 11 and the nut lock 24.

Preferably, the ends of the teeth of the comb element 26 support a circlip of the stop 27, intended to interact with the curved ends of the claws 17 in order to prevent the nut lock 24 coming free from the extraction nut 11 during disassembly.

The nut lock 24 likewise comprises a second end (front) part 28, provided with coupling means 29, designed to interact with the teeth 22 of the locknut 19, to ensure secure coupling with this.

Preferably, the coupling means 29 are designed in the form of a plurality of teeth essentially parallel to the shaft AIP, and not substantially identical to that of the teeth 22 of the locknut 19. Such an interaction between coupling means 22 and 29 allows the locknut 19 and the nut lock 24 to be coupled in rotation.

In addition, this double interaction of the different coupling means allows for the extraction nut 11 and the locknut 19 to be coupled in rotation, once they have been placed in an immobilized position. Accordingly, any initiation of rotation of the extraction nut 11 or of the locknut 19 is prevented by the locknut 19 or the extraction nut 11, due to the fact that the first 1 and the second 7 threads are inverted.

The coupling of the shaft AIP at the bearing support SP is effected as indicated hereinafter.

First, the locknut 19 and its nut lock 24 are fitted on the extraction nut 11. To do this, the teeth of the comb element 26, of the nut lock 24, are introduced between the claws 17 of the extraction nut 11, and the circlip 27 is fixed to the end of the teeth of the comb 26.

The locknut 19 is then definitively blocked on the second thread 7 of the central part 5 of the bearing support SP.

The shaft AIP is then moved into the central cavity of the turboprop engine, from downstream to upstream, until its first thread 1 passes lightly from the rear face of the stop 8 of the bearing support SP.

Figure 3:
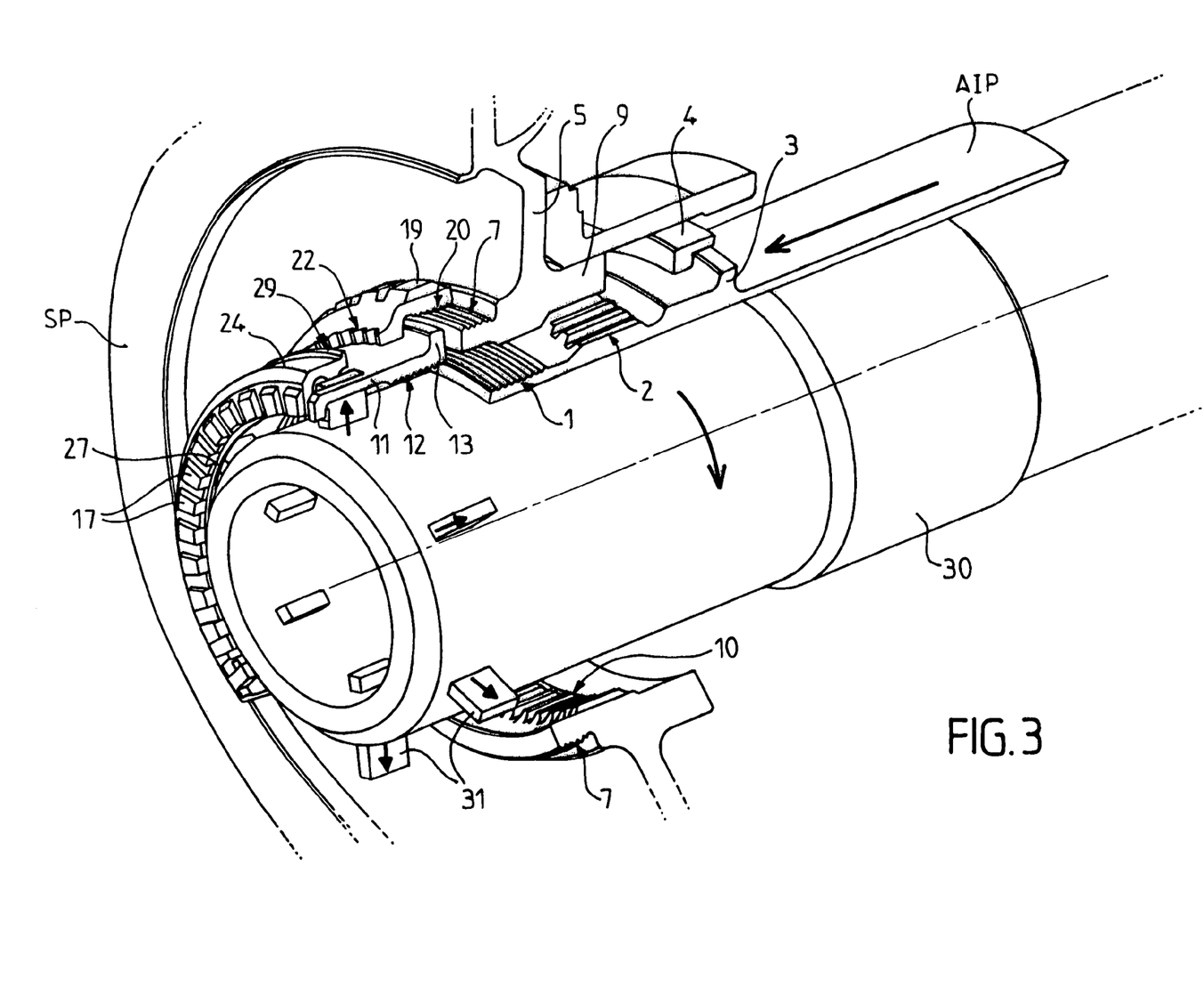
FIG. 3 shows, in a diagrammatic representation, in a longitudinal sectional view, in perspective, the state of the securing device from FIG. 2 after the extraction of the immobilisation element and the unscrewing of the extraction nut with the aid of a first dedicated tool.

The extractor nut 11, provided with its nut lock 24 is then screwed onto the first thread 1 of the shaft AIP with the aid of the first tool 30, as shown in FIG. 3. This first tool 30 is preferably of the telescopic type, and provided on its rear end part (or upstream part) with retractable contact blocks 31, located radially at a distance and intended to come to be located between pairs of adjacent claws 17.

Accordingly, the extraction nut 11 is forced to move until the front face 15 of its stop 13 comes to rest on the rear face of the stop 8 of the bearing support SP. During these initial procedures the nut lock 24 is not coupled to the locknut 19.

Once the extraction nut 11 is located substantially in its immobilisation position, screwing it in position is completed with the aid of the first dedicated tool 30. This causes the relocation of the shaft AIP in relation to the bearing support SP. The slide elements 2 and 10 of the shaft AIP and of the bearing support SP accordingly interact, thus initiating their coupling. The screwing process is completed when the front face of the stop of the front part 9 of the bearing support SP is supported on the rear face of the adjustment key 4, and, at the same time, the front face of the adjustment key 4 is supported on the rear face of the stop 3 of the shaft AIP.

All that then remains is for the nut lock 24 to be relocated downstream on the extraction nut 11 until the teeth 29 of the nut lock 24 interact closely with the teeth 22 of the locknut 19. This frees a space at the level of the claws 17 of the extraction nut 11, and allows locknut 19 and nut lock 24 to couple in rotation, and, in consequence, locknut 19 and the extraction nut 11.

Then, in order to immobilize the movement of the whole of the device D, the elastic split retaining element 18 is introduced into the freed space, with the aid of a second dedicated tool 32 of the type illustrated in FIG. 4. This second tool 32 is preferably of the telescopic type, and is provided on its rear (or upstream) end part with claws 33, capable of being remotely retractable radially, and intended to come to be located in the interior of the elastic retaining element 18 in order to cause the diameter to be varied.

The nut lock 24 can no longer be relocated, with the extraction nut 11 and the locknut 19 being immobilized accordingly and mutually inhibiting any incurral of rotation due to their threads 12 and 20 being inverted. The securing device D, the shaft AIP, and the bearing support SP are then placed in a final position for use, as illustrated in FIG. 2.

The decoupling of the shaft AIP at the bearing support SP is effected by reproducing substantially, in the reverse order, the coupling stages which have been described heretofore. The first step of the procedure is the withdrawal of the elastic retaining element 18 with the aid of the second tool 32. The nut lock 24 is then moved upstream until the circlip 27 is in contact with the curved ends of the claws 17. This allows the extraction nut 11 to be disconnected from the locknut 19. The first tool 30 is then introduced onto the shaft AIP, and its contact blocks 31 are then introduced between the claws 17 of the extraction nut 11. It is then possible for the extraction nut to be unscrewed with the aid of said first tool 30, which forces the shaft AIP to be relocated downstream in relation to the bearing support SP. Decoupling is then effective once the slide elements 2 and 10 of the shaft AIP and the bearing support SP are no longer interacting.

Figure 5:
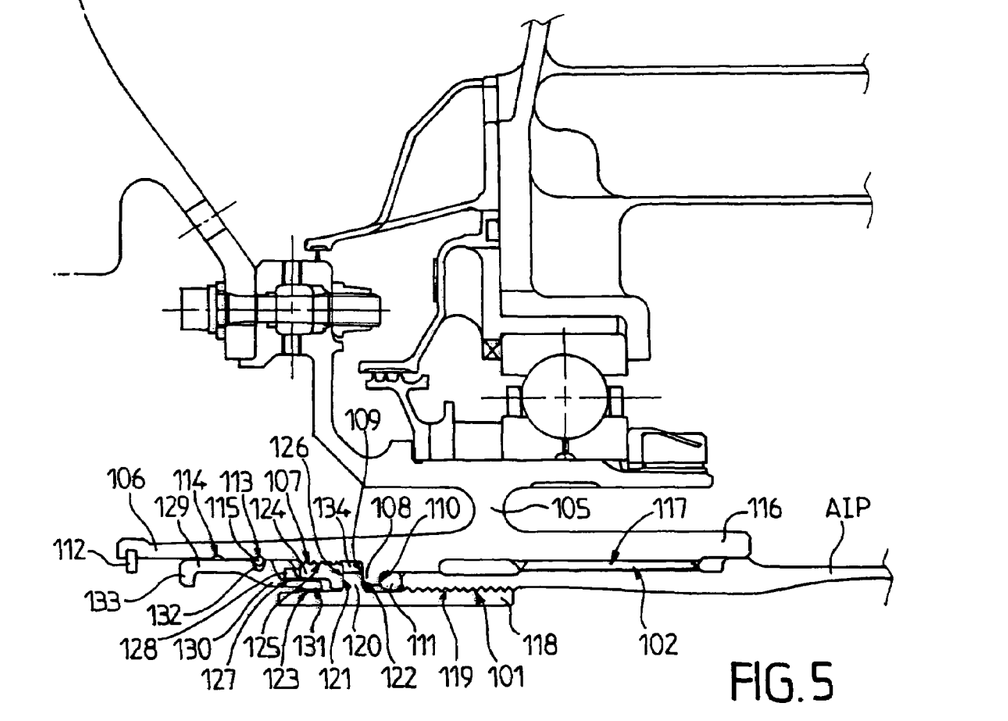
FIG. 5 shows, in a diagrammatic representation, in a longitudinal sectional view, a second embodiment of a securing device according to the invention, in a state of immobilisation.
Figure 6:
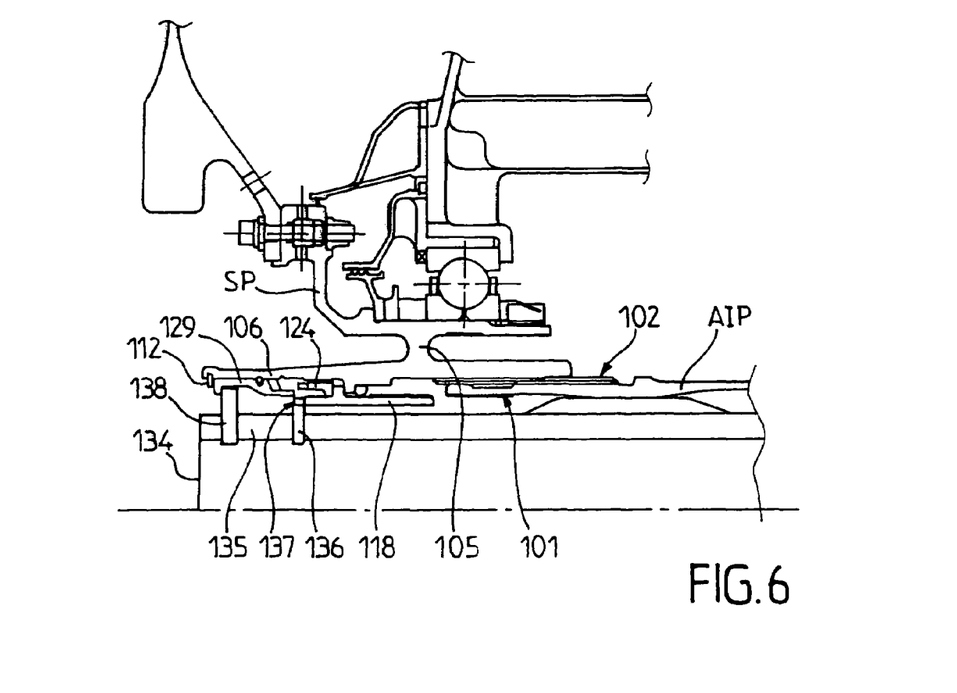
FIG. 6 shows, in a diagrammatic representation, in a longitudinal sectional view, the state of the securing device from FIG. 5 after the disengagement of the nut lock and unscrewing of the extraction nut with the aid of a dedicated tool.

Reference is now made to FIGS. 5 and 6 in order to describe a second embodiment of a securing device according to the invention.

The device D is in this case adapted to fit an intermediate-pressure shaft AIP, comprising, on the one hand, on an inner face, a first thread 101, and, on the other, on an outer face, slightly downstream of said first thread 101 and substantially perpendicular thereto, slide elements (or grooves) 102.

In addition to this, the shaft AIP and the device D are adapted to fit a bearing support (or journal) SP, comprising a central part 105, hollowed out in the centre in order to allow the passage of the shaft AIP, and on the rear face of which there projects a rear part 106, substantially cylindrical and circular, provided on one inner face with a second thread 107 and, slightly downstream of this second thread 107, with a stop 108, comprising a rear face 109 and a front face 110, intended to provide support on a rear face for an adjustment key 111, of which one front face serves as the stop for the shaft AIP. The upstream end of the rear part 106 carries a circlip 112, serving as a travel limit stop. In addition to this, provision is made, at two points selected from the rear part 106, between the circlip 112 and the second thread 107, for two throats 113 and 114, intended to accommodate a spring-loaded immobilisation ring 115, as will be seen hereafter.

According to the invention, the first thread 101 and the second thread 107 are likewise inverted in relation to one another.

In addition, on one front face of the central part 105, a front part 116 projects, preferably substantially cylindrical and circular, and comprising on one inner face guide slide elements (or grooves) 117, intended to interact with the slide elements 102 of the shaft AIP when the latter is displaced in relation to the bearing support SP, during the coupling and decoupling phases.

The securing device D comprises, in the first instance, an extraction (and locking) nut 118, comprising a front part, provided on an outside face with a thread 119, intended to interact with the first thread 101 of the shaft AIP. The front part is extended by a central part comprising, on an outside face, a stop 120, preferably circular and provided with a rear face 121 and a front face 122, intended to be supported on the rear face of stop 109 of the stop 108 of the rear part 106 of the support bearing SP. In addition to this, the central part is extended by a rear end part, on the outer face of which are defined the coupling means 123. These coupling means 123 in this situation preferably have the form of a plurality of slide elements (or grooves) substantially perpendicular to the thread 119.

The securing device D likewise comprises a locknut 124, comprising a main part provided on one outside face with a thread 125, intended to interact with the second thread 107 of the bearing support SP, and terminated by a front face of the stop 126, intended to be supported on the rear face 121 of the stop 120 of the extraction nut 118. This main part likewise comprises, on one inner face, coupling means 127. These coupling means 127 in this case are preferably designed in the form of a plurality of slide elements substantially perpendicular to the thread 125.

The main part is, in addition, extended by an upstream end part 128, defining a rear coupling face.

The securing device D further comprises a nut lock 129, comprising a first (front) end part 130, intended to be introduced, by relocation, between the inner face of the locknut 129 and the outer face of the extraction nut 118. This end part 130 comprises an inner face on which are defined coupling means 131, designed in such a manner as to interact with the slide elements 123 of the extraction nut 118 in order to ensure their coupling. Preferably, the coupling means 131 comprise slide elements (or grooves). Such interaction between coupling means 123 and 131 allows the extraction nut 118 and the nut lock 129 to be coupled in rotation.

In addition, this end part 130 likewise comprises an outer face on which are defined coupling means (not shown for reasons of simplicity) and intended to interact with the slide elements 127 of the locknut 124 in order to ensure their coupling. Preferably, the coupling means 131 comprise slide elements (or grooves). Such interaction between coupling means 127 allows the locknut 124 and the nut lock 129 to be coupled in rotation.

The double interaction ensured by the different coupling means allows the extraction nut 118 and the locknut 124 to be coupled in rotation, one they have been placed in a position of immobilisation. Accordingly, any entrainment to rotation of the extraction nut 118 or of the locknut 124 is prevented by the locknut 124 or the extraction nut 118 due to the fact that the first 101 and second 107 threads are inverted.

The end part 130 is extended by a central part on the outer face of which is defined a circular throat 132, intended to accommodate the spring-loaded ring 115. This spring-loaded ring 115 is intended, when partly located in the first throat 113 of the bearing support SP, to prevent any relocation of the nut lock 129. In addition, when the spring-loaded ring 115 is partially located in the second throat 114 of the bearing support SP (see FIG. 6), it enables the immobilisation of the nut lock 129 in a waiting position in which the extraction nut 118 and locknut 124 are decoupled.

The central part is itself extended by an end part 133, defining a stop intended to be supported against the circlip 112 carried by the bearing support SP in such a way as to limit the travel of the nut lock 129 and to define its waiting position.

Preferably, the securing device D likewise comprises a cross-piece 134 interposed between a downstream face of the stop 120 of the extraction nut 118 and the upstream face of the rear part 106 of the bearing support SP. This allows a degree of play to be created, which facilitates the screwing and unscrewing of the extraction nut 118.

It is important to note that the cross-piece 134 may be formed in a part of the front face of the stop 126.

The coupling of the shaft AIP to the bearing support SP is effected as indicated hereinafter.

First, the extractor nut 118 is introduced, interposing the cross-piece 134, in such a way that the front face 122 of its stop 120 is supported essentially on the rear stop face 109 of the stop 108 of the bearing support SP.

The locknut 124 is then introduced, and screwed on until its front stop face 126 comes to be supported substantially on the rear face of the cross-piece 134, or on the rear face 109 of the stop 108 of the bearing support SP when the cross-piece 134 forms an integral part of the front stop face 126. The nut lock 129 is then mounted in the rear waiting position, and then the circlip 112 is fitted (in this case in the form of an elastic ring).

The shaft AIP is then relocated into the central cavity of the turboprop engine, from downstream to upstream, until its first thread 101 reaches the thread 119 of the extraction nut 118. The extraction nut 118 is then screwed onto the first thread 101, with the aid of a tool 134, illustrated in FIG. 6. This tool 134 is preferably of the telescopic type and mounted on a rear (or upstream) end part 135 of a series of contact blocks 136 which are remotely retractable in a radial direction and intended to be located in the apertures 137 defined in the rear end part of the extraction nut 118.

During screwing, the slide elements 101 and 119 of the bearing support SP and the extraction nut 118 interact in order to guide the relocation of the shaft AIP upstream. The screwing process stops when the rear face of the shaft AIP is supported on the front face of the adjustment key 111.

All that then remains is to relocate the nut lock 129 downstream, with the aid of the tool 134, in such a way that the end (front) part 130 penetrates into the inner face of the locknut 129 and the outer face of the extraction nut 118. This relocation is rendered possible by one or more blocks 137, remotely retractable in a radial direction, installed in the rear end part 135 of the tool 134.

The interaction between the different slide elements accordingly ensures the coupling in rotation of the extraction nut 118 and the locknut 124, via the nut lock 129, with the bearing support SP.

When the spring-loaded ring 115 enters the first throat 113, the nut lock 129 is then placed in an immobilisation position in which it prevents any relocation of the extraction nut 118 and of the locknut 124. The extraction nut 118 and the locknut 124 accordingly mutually prevent any entrainment of rotation due to the fact that their threads 119 and 127 are inverted. The securing device D, the shaft AIP, and the bearing support SP are then placed in a final position for use, illustrated in FIG. 5.

The decoupling of the shaft AIP from the bearing support SP is effected by essentially reproducing, in reverse order, the coupling stages described heretofore. First, the nut lock 129 is withdrawn by relocation, with the aid of the blocks 138 of the tool 134. Once the nut lock 129 is immobilised in its waiting position (stopped against the circlip 112 and its spring-loaded ring 115, located partially in the second throat 114 of the bearing support SP), the blocks 136 of the tool 134 are introduced into the apertures 137 of the extraction nut 118. The extraction nut is then unscrewed, by incurring the rotation of said tool 134. This forces the shaft AIP to be relocated downstream in relation to the bearing support SP. Decoupling then takes effect once the slide elements 102 and 117 of the shaft AIP and the bearing support SP are no longer interacting, as illustrated in FIG. 6.

Figure 7:
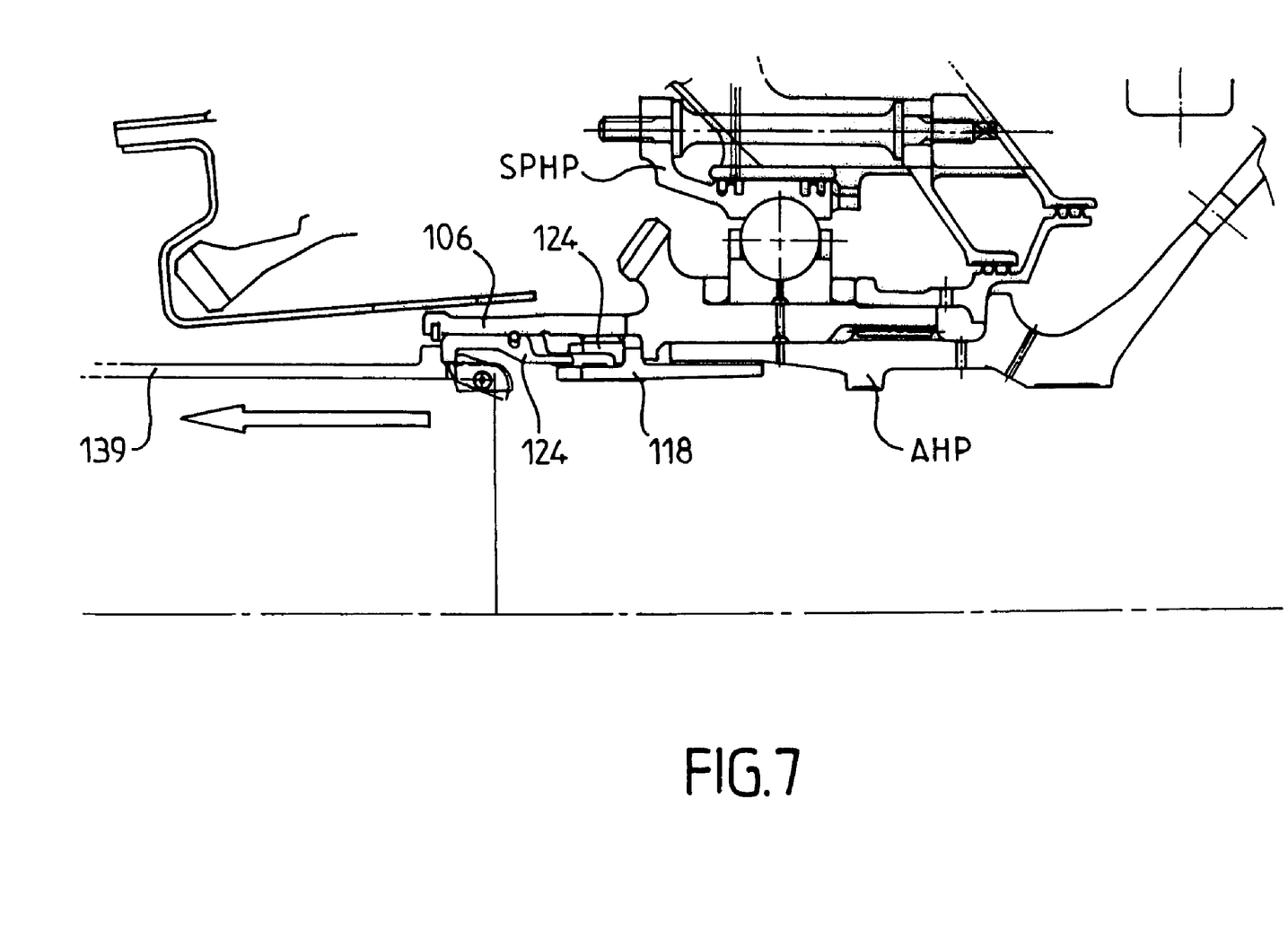
FIG. 7 shows, in a diagrammatic representation, in a perspective view, a variant of a tool which enables the relocation of the nut lock and initiates the rotation of the extraction nut from the second embodiment according to the invention, adapted to fit the coupling of a shaft and a bearing support for the high-pressure (HP) body.

A description has been provided heretofore of a method of coupling and decoupling carried out by the introduction of a tool from downstream to upstream. It is equally possible, however, for the tool to be introduced from upstream to downstream. In addition, other types of tools can be envisaged, such as, for example, a spanner 139, specifically a slotted spanner of the type illustrated in FIG. 7. This spanner 139 is more particularly well-suited to the coupling/decoupling of a high-pressure shaft AHP and a bearing support SPHP of a high-pressure body CHP of a turboprop engine.

In addition to this, the securing device according to the invention is suitable for the coupling of a shaft on a bearing support, belonging not only to an intermediate body or a high-pressure body, as described heretofore in reference to FIGS. 2 to 7, but equally to a low-pressure body.

The invention is not limited to the embodiments of the securing device described heretofore, only by way of example, but also encompasses all the variants which might be envisaged by the person skilled in the art within the framework of the claims hereinafter.

The invention claimed is:

1. A securing device for a machine or engine shaft on a bearing support, comprising:
    an extraction nut provided with a thread suitable for interacting with a first thread of said shaft, and
    a locknut provided with a thread suitable for interacting with a second thread of said bearing support, in such a way as to immobilise said shaft in relation to said bearing support in a chosen position, wherein
    said first and second threads are inverted in relation to one another,
    said locknut comprises a stop provided with a front face and first coupling means,
    said extraction nut comprises second coupling means and a stop provided with a front face configured to be supported on a rear face of a stop of said bearing support in order to define said chosen position, and a rear face on which butts said front face of the stop of the locknut when placed in an immobilisation position, and
    further comprising a nut lock provided with third and fourth coupling means, designed to interact respectively with said first and second coupling means, in such a way as to couple in rotation said extraction nut and said locknut, once they are in an immobilisation position defining said chosen position.

2. The device according to claim 1, wherein said thread of the extraction nuts is located on an inner face in such a way as to interact with said first thread located on an outer face of the shaft.

3. The device according to claim 2, wherein said thread of the locknut is located on an inner face in such a way as to interact with said second thread of the bearing support, located on an outer face.

4. The device according to claim 2, wherein said nut lock is mounted in translation on said extraction nut.

5. The device according to claim 2, wherein said extraction nut has an end part opposed to said stop and is provided with at least two claws curved inwards and constituting said second coupling means, and in that said nut lock has a first end part constituting said fourth coupling means and designed in such a way as to interact with said claws in order to ensure coupling in rotation to said extraction nut.

6. The device according to claim 5, wherein said first end part supports a stop circlip configured to interact with said claws in order to prevent the nut lock from becoming detached from the extraction nut in the event of disassembly.

7. The device according to claim 5, wherein said claws define a specific location to accommodate blocking means configured to place said nut lock in its immobilisation position.

8. The device according to claim 7, wherein said blocking means (18) are designed in the form of an elastic locking ring.

9. A turbo-engine according to claim 5, wherein said claws define a specific location to accommodate blocking means configured to place said nut lock in its immobilisation position.

10. A turbo-engine according to claim 9, wherein said blocking means are designed in the form of an elastic locking ring.

11. The device according to claim 2, wherein said locknut has an end part extending said stop on the side opposed to its front face and provided with teeth constituting said first coupling means, and in that said nut lock has a second end part provided with teeth constituting said third coupling means and designed to interact with the teeth of said locknut in order to ensure its coupling in rotation with said locknut.

12. The device according to claim 1, wherein said thread of the extraction nut is located on an outer face in such a way as to interact with said first thread located on an inner face of the shaft.

13. The device according to claim 12, wherein said thread of the locknut is located on an outer face in such a way as to interact with said second thread of the bearing support located on an inner face.

14. The device according to claim 12, wherein said extraction nut has a first end part provided with said outer thread and a second end part opposed to said first part in relation to the stop and provided on an outer face with slide elements constituting said second coupling means, and in that said nut lock has a first end part provided with slide elements constituting said fourth coupling means and designed in such a way as to interact with said slide elements of the extraction nut in order to ensure its coupling in rotation with said extraction nut.

15. The device according to claim 14, wherein said nut lock comprises a second end part opposed to said first end part and provided with at least one blocking stop configured to interact with a circlip mounted on said bearing support in order to block its passage in the event of disassembly.

16. The device according to claim 14, wherein said first part of the nut lock is designed in such a way as to be introduced by relocation between said first end part of said extraction nut and the end part of said locknut.

17. The device according to claim 12, wherein said locknut has an end part opposed to said stop and comprising an inner face provided with slide elements constituting said first coupling means, and in that said nut lock has a first end part provided on an outer face with slide elements constituting said third coupling means and designed to interact with the slide elements of said locknut in order to ensure its coupling in rotation with said locknut.

18. The device according to claim 12, wherein said nut lock comprises on an outer face a throat configured to accommodate an elastic locking ring configured to interact with a throat formed in an inner face of the bearing support in order to locate said nut lock in its immobilisation position.

19. A turbo-engine according to claim 1, wherein said thread of the extraction nut is located on an outer face in such a way as to interact with said first thread located on an inner face of the shaft.

20. A turbo-engine according to claim 19, wherein said thread of the locknut is located on an outer face in such a way as to interact with said second thread of the bearing support located on an inner face.

21. A turbo-engine according to claim 19, wherein said extraction nut has a first end part provided with said outer thread and a second end part opposed to said first part in relation to the stop and provided on an outer face with slide elements constituting said second coupling means, and in that said nut lock has a first end part provided with slide elements constituting said fourth coupling means and designed in such a way as to interact with said slide elements of the extraction nut in order to ensure its coupling in rotation with said extraction nut.

22. A turbo-engine according to claim 21, wherein said first part of the nut lock is designed in such a way as to be introduced by relocation between said first end part of said extraction nut and the end part of said locknut.

23. A turbo-engine according to claim 21, wherein said nut lock comprises a second end part opposed to said first end part and provided with at least one blocking stop configured to interact with a circlip mounted on said bearing support in order to block its passage in the event of disassembly.

24. A turbo-engine according to claim 19, wherein said locknut has an end part opposed to said stop and comprising an inner face provided with slide elements constituting said first coupling means, and in that said nut lock has a first end part provided on an outer face with slide elements constituting said third coupling means and designed to interact with the slide elements of said locknut in order to ensure its coupling in rotation with said locknut.

25. A turbo-engine according to claim 19, wherein said nut lock comprises on an outer face a throat configured to accommodate an elastic locking ring configured to interact with a throat formed in an inner face of the bearing support in order to locate said nut lock in its immobilisation position.

26. An engine comprising:
a shaft;
a bearing support; and
a securing device configured to secure said shaft on said bearing support, wherein said securing device comprises:
an extraction nut provided with a thread suitable for interacting with a first thread of said shaft, and
a locknut provided with a thread suitable for interacting with a second thread of said bearing support, in such a way as to immobilise said shaft in relation to said bearing support in a chosen position, wherein
said first and second threads are inverted in relation to one another,
said locknut comprises a stop provided with a front face and first coupling means,
said extraction nut comprises second coupling means and a stop provided with a front face configured to be supported on a rear face of a stop of said bearing support in order to define said chosen position, and a rear face on which butts said front face of the stop of the locknut when placed in an immobilisation position, and
further comprising a nut lock provided with third and fourth coupling means, designed to interact respectively with said first and second coupling means, in such a way as to couple in rotation said extraction nut and said locknut, once they are in an immobilisation position defining said chosen position.

27. A turbo-engine according to claim 26, wherein said thread of the extraction nuts is located on an inner face in such a way as to interact with said first thread located on an outer face of the shaft.

28. A turbo-engine according to claim 27, wherein said thread of the locknut is located on an inner face in such a way as to interact with said second thread of the bearing support, located on an outer face.

29. A turbo-engine according to claim 27, wherein said nut lock is mounted in translation on said extraction nut.

30. A turbo-engine according to claim 27, wherein said extraction nut has an end part opposed to said stop and is provided with at least two claws curved inwards and constituting said second coupling means, and in that said nut lock has a first end part constituting said fourth coupling means and designed in such a way as to interact with said claws in order to ensure coupling in rotation to said extraction nut.

31. A turbo-engine according to claim 30, wherein said first end part supports a stop circlip configured to interact with said claws in order to prevent the nut lock from becoming detached from the extraction nut in the event of disassembly.

32. A turbo-engine according to claim 27, wherein said locknut has an end part extending said stop on the side opposed to its front face and provided with teeth constituting said first coupling means, and in that said nut lock has a second end part provided with teeth constituting said third coupling means and designed to interact with the teeth of said locknut in order to ensure its coupling in rotation with said locknut.

33. The engine according to claim 26, wherein said engine is a turbo prop engine.

34. The engine according to claim 26, wherein said engine is a turbo-engine.

35. A device for securing a shaft to a bearing support, said device comprising:
- an extraction nut having a thread to interact with a first thread of said shaft and a second coupling device;
- a lock nut having threads to interact with a second thread provided on the bearing support, a first coupling device, and a stop wherein the first and second threads are inverted with respect to each other; and
- a nut lock provided with third and fourth coupling devices that interact with the first and second coupling devices.

* * * * *